United States Patent
Gu et al.

(10) Patent No.: US 11,080,615 B2
(45) Date of Patent: Aug. 3, 2021

(54) GENERATING CHAINS OF ENTITY MENTIONS

(71) Applicant: International Business Machines Corporation, Armonk, NY (US)

(72) Inventors: Yu Gu, Austin, TX (US); Dingcheng Li, Sunnyvale, CA (US); Kai Liu, Somerville, MA (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 15/623,525

(22) Filed: Jun. 15, 2017

(65) Prior Publication Data

US 2018/0365588 A1    Dec. 20, 2018

(51) Int. Cl.
*G06N 5/04* (2006.01)
*G06N 20/00* (2019.01)
(Continued)

(52) U.S. Cl.
CPC ........... *G06N 20/00* (2019.01); *G06F 16/353* (2019.01); *G06F 16/90335* (2019.01);
(Continued)

(58) Field of Classification Search
CPC .. G05B 13/0265; G05B 13/028; G05B 13/02; G06N 20/00; G06N 5/00; G06N 5/022;
(Continued)

(56) References Cited

U.S. PATENT DOCUMENTS 6,185,592 B1    2/2001  Boguraev
6,438,543 B1    8/2002  Kazi
(Continued)

FOREIGN PATENT DOCUMENTS

CN         102262632 B      3/2014

OTHER PUBLICATIONS

Alam et al. "Structured and Unstructured Document Summarization: Design of a Commercial Summarizer using Lexical Chains", ICDAR, 2003, pp. 6.*
(Continued)

*Primary Examiner* — Li Wu Chang
(74) *Attorney, Agent, or Firm* — Daniel R. Simek; William H. Hartwell; Aaron N. Pontikos

(57) ABSTRACT

Aspects of the present invention disclose a method for analyzing data from a plurality of data sources. The method includes extracting features of data received from a first source and from a second source by analyzing the data received from the first source of data and from the second source. The method includes processors determining a topic modeling framework, wherein the topic modeling framework detects a semantic structure of the features of the data received from the first data source and the second source. The method includes processors applying the topic modeling framework to the data received from the first source of data the second source of data. The method includes generating a final entity output, wherein the final entity output includes a cluster of entity mentions that the applied topic modeling framework extracts from the first source of data and the second source of data are combined.

20 Claims, 3 Drawing Sheets

(51) Int. Cl.
*G06F 16/903* (2019.01)
*G06F 16/35* (2019.01)
*G06N 7/00* (2006.01)
*G06N 5/02* (2006.01)

(52) U.S. Cl.
CPC .............. *G06N 5/022* (2013.01); *G06N 5/04* (2013.01); *G06N 7/005* (2013.01)

(58) Field of Classification Search
CPC ............ G06N 5/02; G06N 7/005; G06N 7/00; G06N 5/04; G06T 1/00; G06T 2207/20081; G06T 5/00; G06T 1/20; G06F 15/18; G06F 17/00; G06F 16/353; G06F 16/35; G06F 16/90335; G06F 16/903; G06K 9/36; G06K 9/46
See application file for complete search history.

(56) References Cited

U.S. PATENT DOCUMENTS

| | | | |
|---|---|---|---|
| 8,457,950 | B1 | 6/2013 | Gardner |
| 8,856,099 | B1 | 10/2014 | Lasko et al. |
| 8,862,460 | B2 | 10/2014 | Cai |
| 9,535,902 | B1* | 1/2017 | Michalak ............... G06F 40/284 |
| 9,923,931 | B1 | 3/2018 | Wagster et al. |
| 2006/0136259 | A1 | 6/2006 | Weiner et al. |
| 2009/0076799 | A1 | 3/2009 | Crouch |
| 2009/0164416 | A1 | 6/2009 | Guha |
| 2010/0293451 | A1 | 11/2010 | Carus |
| 2012/0321204 | A1 | 12/2012 | Fertik et al. |
| 2015/0081323 | A1 | 3/2015 | Jackson et al. |
| 2015/0324454 | A1* | 11/2015 | Roberts ................... G06F 16/93 707/734 |
| 2016/0154859 | A1 | 6/2016 | Skurtovich, Jr. et al. |
| 2016/0342600 | A1 | 11/2016 | Salaka et al. |
| 2017/0032023 | A1 | 2/2017 | Mitra et al. |

OTHER PUBLICATIONS

Chowdhury, et al., "A controlled greedy supervised approach for co-reference resolution on clinical text", Journal of Biomedical Informatics, 10 pages.

List of IBM Patents or Patent Applications Treated as Related, Appendix P, Filed Herewith, 2 pages.

Gu, et al., "Analyzing Data From Structured and Unstructured Sources", U.S. Appl. No. 15/856,337, filed Dec. 28, 2017, (a copy is not provided as this application is available to the Examiner).

Wick et al., "A discriminative hierarchical model for fast coreference at large scale", ACL '12 Proceedings of the 50th Annual Meeting of the Association for Computational Linguistics: Long Papers—vol. 1, Jeju Island, Korea, Jul. 8-14, 2012, pp. 379-388.

Collobert et al., "A Unified Architecture for Natural Language Processing: Deep Neural Networks with Multitask Learning", Proceedings of the 25th International Conference on Machine Learning, Helskinki, Finland, 2008, 8 pages. © 2008.

Ling et al., "Fine-Grained Entity Recognition", Association for the Advancement of Artificial Intelligence, www.aaai.org, 7 pages, © 2012.

Baars et al., "Managment Support with Structured and Unstructured Data—An Integrated Business Intelligence Framework", Information Systems Management 25(2), Mar. 2008, pp. 132-148.

Agrawal et al., "Mining Association Rules between Sets of Items in Large Databases", ACM SIGMOD Record, vol. 22, Jun. 1193, pp. 207-216.

Magnini et al., "Ontology Population from Textual Mentions: Task Definition and Benchmark", Proceedings of the 2nd Workshop on Ontology Learning and Population, Jul. 2006, Sydney, pp. 26-32, © 2006.

Michelson et al., "Mining the Heterogeneous Transformations between Data Sources to Aid Record Linkage", Proceedings of the 2009 International Conference on Artificial Intelligence, ICAI 2009, Las Vegas, Nevada, Jul. 13-16, 2009.

Yi et al., "Sentiment Analyzer: Extracting Sentiments about a Given Topic using Natural Language Processing Techniques", Proceedings of the Third IEEE International Conference on Data Mining (ICDM '03), 8 pages, © 2003 IEEE.

Gorinski et al., "Towards Weakly Supervised Resolution of Null Instantiations", Proceedings of the 10th International Conference on Computational Semantics (IWCS 2013)—Long Papers, 2013, pp. 119-130.

Kalmar et al., "FICO: Web Person Disambiguation Via Weighted Similarity of Entity Contexts", Proceedings of the 4th International Workshop on Semantic Evaluations (SemEval-2007), Prague, Jun. 2007, pp. 149-152, © 2007 Association for Computational Linguistics.

* cited by examiner

GENERATING CHAINS OF ENTITY MENTIONS

BACKGROUND

The present invention relates generally to the field of machine learning, and more particularly to natural language analytics.

Machine learning is designed to construct algorithms that are able to learn to predict a certain target output. To facilitate this, the learning algorithm is presented some training examples that demonstrate the intended relation of input and output values. The learner is supposed to approximate the correct output even for an example that it has not been shown during training.

Unsupervised machine learning is the machine learning task of inferring a function to describe hidden structure from unlabeled data (a classification or categorization is not included in the observation). Approaches to unsupervised learning include clustering through k-means, or mixture models, or hierarchical clustering and anomaly detection. Comparatively, supervised learning is the machine learning task of inferring a function from unlabeled training data. The training data consists of a set of training examples.

In supervised learning, each training example is a pair consisting of an input object, typically a vector, and a desired output value commonly called the supervisory signal. A supervised learning algorithm analyzes the training data and produces an inferred function which can be used for mapping new training examples. The purpose of this algorithm is to correctly determine the class labels for unseen instances which require the learning algorithm to generalize from the training data to predict outputs given inputs the learner has not encountered.

SUMMARY

According to one embodiment of the present invention, a method for analyzing data from a plurality of data sources is provided. The method for analyzing data from a plurality of sources may include one or more processors extracting features of data received from a first source and features of the data received from a second source by analyzing the data received from the first source of data and the data received from the second source of data. The method further includes one or more processors determining a topic modeling framework, wherein the topic modeling framework detects a semantic structure of the features of the data received from the first data source and the data received from the second data source. The method further includes one or more processors applying the topic modeling framework to the data received from the first source of data and to the data received from the second source of data. The method further includes generating a final entity output, wherein the final entity output includes a cluster of entity mentions that the applied topic modeling framework extracts from the first source of data and the second source of data are combined.

DETAILED DESCRIPTION

Embodiments of the present invention recognize that current identical entity generation techniques are merely supervised or unsupervised. Supervised and unsupervised models can have problems that are unique to each system. The prime problem with supervised models, like pairwise classification of words, is that they strongly depend on an annotated textual corpus and require well-defined rules to analyze data, which makes the supervised model less reliable and less portable. Unsupervised models rely on co-occurrences of text, and these models tend to be inconsistent because of the random nature inherent in making inferences from untrained data.

Embodiments of the present invention provide a semi-supervised feature, so the analysis does not depend on training data, that utilizes both structured and unstructured data, while using a global flexible feature extractor to analyze a diverse group of data to produce portable and consistent results. Embodiments of the present invention provide a topic modeling framework for constructing identical entity chains among unrelated data. Embodiments of the present invention further eliminate the need for manual annotations of co-referring relations. In addition, the present invention overcomes limitations based on randomness and overcomes the problem of co-occurrences by the integration of similarity metrics and topic modeling.

Figure 1:
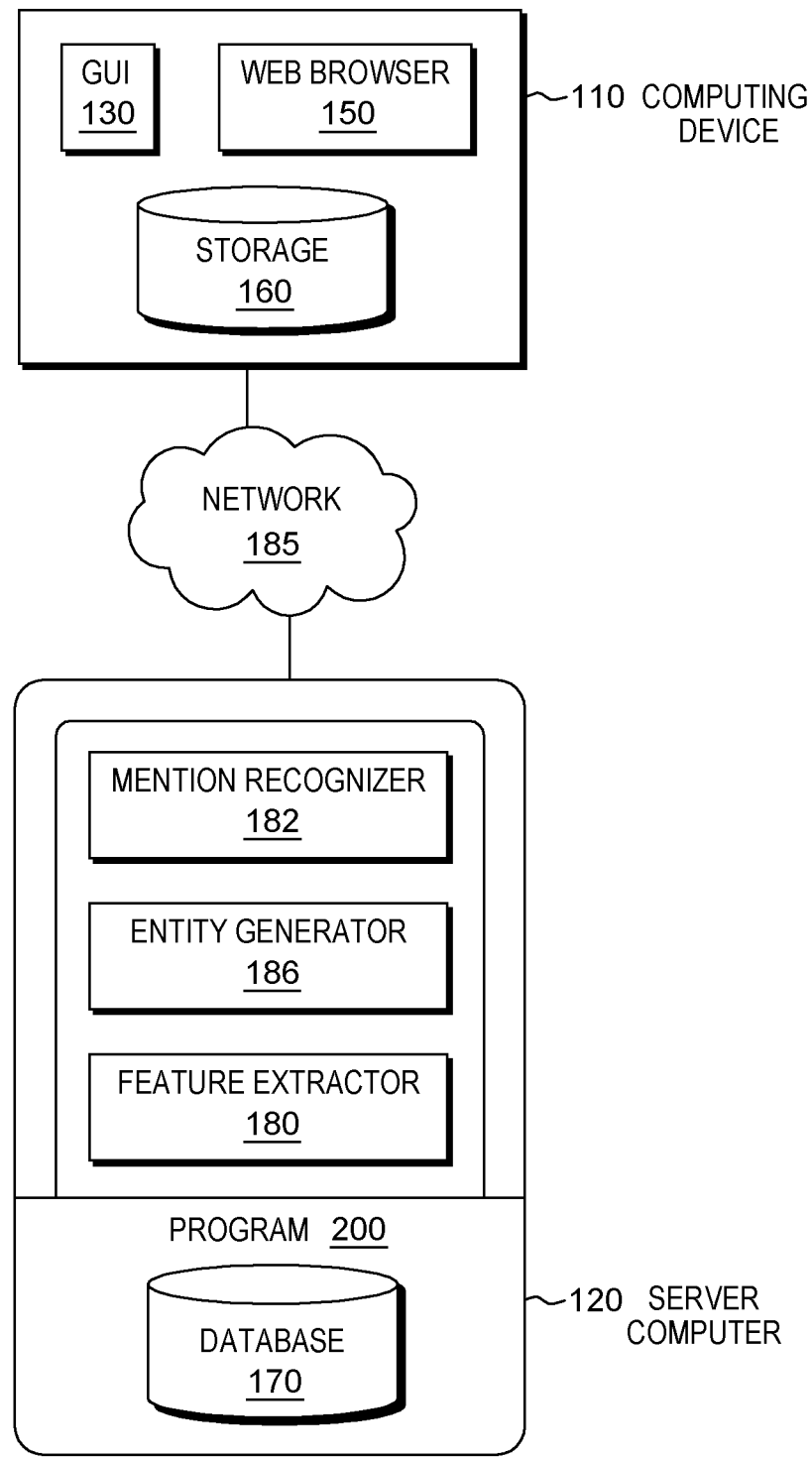
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram illustrating the distributed data processing environment. The distributed data processing environment includes computing device 110 and server computer 120, interconnected over network 185.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as is common in data centers and with cloud computing applications. In general, computing device 110 is representative of any programmable electronic device or combination of programmable electronic devices capable of executing machine-readable program instructions and communicating with other computer devices via a network.

In one embodiment, computing device 110 includes graphical user interface (GUI) 130, web browser 150, and storage 160. The various programs on computing device 110 include a web browser, an electronic mail client, security software (e.g., a firewall program, a geo-locating program, an encryption program, etc.), an instant messaging (IM) application (app), and a communication (e.g., phone) application.

In one embodiment, graphical user interface 130 operates on computing device 110. In another embodiment, graphical user interface 130 operates on another computer in a server based setting, for example on a server computer (e.g., server computer 120). In yet another embodiment, graphical user interface 130 operates on computing device 110 simultaneously with a server computer interconnected through network 185. Graphical user interface 130 may be any user interface used to access information from computing device 110, such as information gathered or produced by program 200. Additionally, graphical user interface 130 may be any user interface used to supply information to computing device 110, such as information supplied by a user to be used by program 200. In some embodiments, graphical user interface 130 may present a generic web browser used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An 110 device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 3, in accordance with embodiments of the present invention.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 185. In the depicted environment, web browser 150 resides on computing device 110. In other embodiments, web browser 150, or similar web browsers, may reside on other computing devices capable of accessing a webpage over network 185.

Storage 160, a database, located on computing device 110, represents any type of storage device capable of storing data that is accessed and utilized by computing device 110. In other embodiments, storage 160 represents multiple storage devices within computing device 110. Storage 160 stores information such as, but not limited to, account information, credentials for authentication, user preferences, lists of preferred users, previously visited websites, history of visited Wi-Fi portals, and the history of the location of the computing device.

In general, network 185 can be any combination of connections and protocols that will support communications among computing device 110. Network 185 can include, for example, a local area network (LAN), a wide area network (WAN), such as the Internet, a cellular network, or any combination of the preceding, and can further include wired, wireless, and/or fiber optic connections.

Server computer 120 may be a desktop computer, a laptop computer, a tablet computer, a specialized computer server, a smartphone, or any other computer system known in the art. In certain embodiments, server computer 120 represents a computer system utilizing clustered computers and components that act as a single pool of seamless resources when accessed through network 185, as is common in data centers and with cloud computing applications. In general, server computer 120 is representative of any programmable electronic device or combination of programmable electronic devices capable of executing machine-readable program instructions and communicating with other computer devices via a network. In one embodiment, server computer 120 includes database 170, feature extractor 180, mention recognizer 182, entity generator 186, and program 200.

Database 170 may be a repository that may be read by program 200. In an example embodiment, the Unified Medical Language System, and information, such as clinical databases, and other information may be stored to database 170. In some embodiments database 170 may access and retrieve information from other medical and clinical databases. In other embodiments, a program on server computer 120 (not shown) may prompt and update database 170 with information. The data stored to database 170 may be changed or updated by data input by a user, such as a user with access to server computer 120. In one embodiment, database 170 resides on server computer 120. In other embodiments, database 170 may reside on another server, another computing device, or mobile device, provided that database 170 is accessible to program 200. Database 170 operates to enhance program 200 by increasing the accuracy or amount of data available to program 200.

Feature extractor 180 (a subprogram of program 200) is an advanced natural language processor drive sub program designed to retrieve syntactic information from knowledge resources. Feature extractor 180 is an information retrieval based knowledge resource feature extractor. In general, feature extractor 180 accesses a clinical database, such as UMLS, to identify and analyze text using the concept unique identifier. A concept unique identifier is a sub program of feature extractor 180 that selects and extracts the unique concept from the entirety of the text. The unique concept is the longest, complete phrase that has been identified through the knowledge resource. For example, feature extractor 180, utilizing the concept unique identifier in consultation with the knowledge resource (e.g., UMLS), selects the unique concept, "total abdominal hysterectomy" from the text and analyzes the text in conjunction with the entirety of the text to "abdominal hysterectomy" and "hysterectomy." Feature extractor 180, utilizing concept unique identifier, is able to determine that "total abdominal hysterectomy" is a unique concept through sub dividing the word and cross referencing the entirety of the text and each individual component of the text, as described in the previous sentence, with a knowledge database.

Feature extractor 180 can utilize (not shown) a raw text reader and markable reader to detect sentences. A markable reader is a named entity recognizer that discovers groups of textual mentions that belong to a semantic class. Comprehensively, feature extractor 180 employs a tokenizer, tagger, word dependency parser, and constantly accesses the UMLS dictionary to determine and separate sentences and phrases of clinical relevance from sentences and phrases that do not have medical relevance. In the event that feature extractor 180 is unable to identify a concept unique identifier of medical relevance in a phrase, then a word parser analyzes the phrase.

Mention recognizer 182 (a subprogram of program 200) enables program 200 to analyze, recognize, and retrieve a set of key elements from large amounts of unstructured and structured data. In an embodiment, mention recognizer 182 analyzes a combination of unstructured and structured clinical notes. In this example, mention recognizer 182 analyzes the handwritten notes (i.e., an unstructured data source) of a health care provider and derives that the results of a fasting glucose test, on Jun. 12, 2012, for a patient was 140, and the patient experienced nausea two days after the test, Jun. 14, 2012. Mention recognizer 182 finds an identical mention (i.e., a co-reference) in an electronic (i.e., structured data source) medical record based on the fact that the entry mentions 140/mg/dl on Jun. 12, 2012. Mention recognizer 182 ascertains that two mentions refer to two different dates from a structured and an unstructured data source.

Entity generator 186 (a subprogram of program 200) directs the identical entity generation process. Entity generator 186 directs the process of clustering identical mentions from a block of text, finding mentions referring to the same entities, and combining identical mentions to form entity chains from the initial block of text. In an embodiment, entity generator 186 analyzes text to create mentions that are connected together as an entity chain. In this example, entity generator 186 analyzes the block of text, "The patient presents with gastrointestinal symptoms including nausea, vomiting. She has had symptoms for 10 days. In fact, is having that problem since pregnancy but worse since 10 days."

Entity generator 186 derives mentions that eventually form the entity chain from that text as, "The patient, gastrointestinal symptoms, nausea, vomiting, She, symptoms, that problem, early pregnancy." Entity generator 186 discovers five entities from the mentions derived from the text to direct the creation of five entity chains as: (1) The patient, (2) gastrointestinal symptoms, (3) nausea, (4) vomiting, (5) early pregnancy.

In one embodiment, program 200 operates on server computer 120. In another embodiment, program 200 operates on another computer in a server based setting, for example on a server computer not shown. In yet another embodiment, program 200 operates on computing device 110 simultaneously with server computer 120 interconnected through network 185. Program 200 provides the capability to identify and collect a set of key elements from large amounts of unstructured data and then generate and verify a new entity. An entity is an object or set of objects created from a block of text. An entity includes nouns, pronouns, phrases, and verbal phrases that refer to objects in medical or clinical notes. Program 200 is capable of utilizing Wi-Fi technology, Bluetooth, Near Field Communication tags (NFC), Global System for Mobile Communications (GSM), and Global Positioning System Technology (GPS) to communicate with computing device 110.

In an example embodiment, program 200 operates as a code snippet within one or more applications on computing device 110. Code snippets define the scope of interactivity between the snippets and the application, (e.g., program 200 hosted by a web browser application on server computer 120). For example, program 200 is a function within web browser 150, and the processes of program 200 occur automatically (i.e., without user intervention) during the operation of web browser 150 as initiated by program 200. The dynamic code snippet elements provide scripting support. The variables enable dialog between program 200, through server computer 120, graphical user interface 130, and web browser 150.

In one embodiment, program 200 has the ability to access computing device 110 to define a topic modeling framework for constructing identical entity chains. In an example, program 200 initiates the topic modeling process of discovering the abstract topics that occur in a collection of medical or clinical documents. In this example program 200 activates a text mining feature to discover hidden semantic structures in the text body of a collection of medical or clinical documents.

In another embodiment, program 200 has the ability to construct traceable longitudinal electronic health records from the creation of high-performance identical entity generations. In this example, program 200 analyzes a medical or clinical document over a defined time span to generate a condensed, trackable, streamlined order of notes that assist in the cohort identification or aid in patient risk prediction and analysis. Program 200 analyzes the text over a defined time frame in order to find identical mentions that occurred over the time frame. Program 200 utilizes the analyzed information to decide which entities are valuable.

In yet another embodiment, program 200 has the ability to generate a semi-supervised feature to avoid the need to use training data. In an example, program 200 utilizes structured and unstructured clinical notes, utilizes a global flexible feature extractor, and integrates Bayesian, and diverse similarity measures. Program 200 does not require a user to manually annotate co-referenced relations among text, nor does program 200 utilize co-occurrences amongst text to create co-reference chains among clinical notes.

Figure 2:
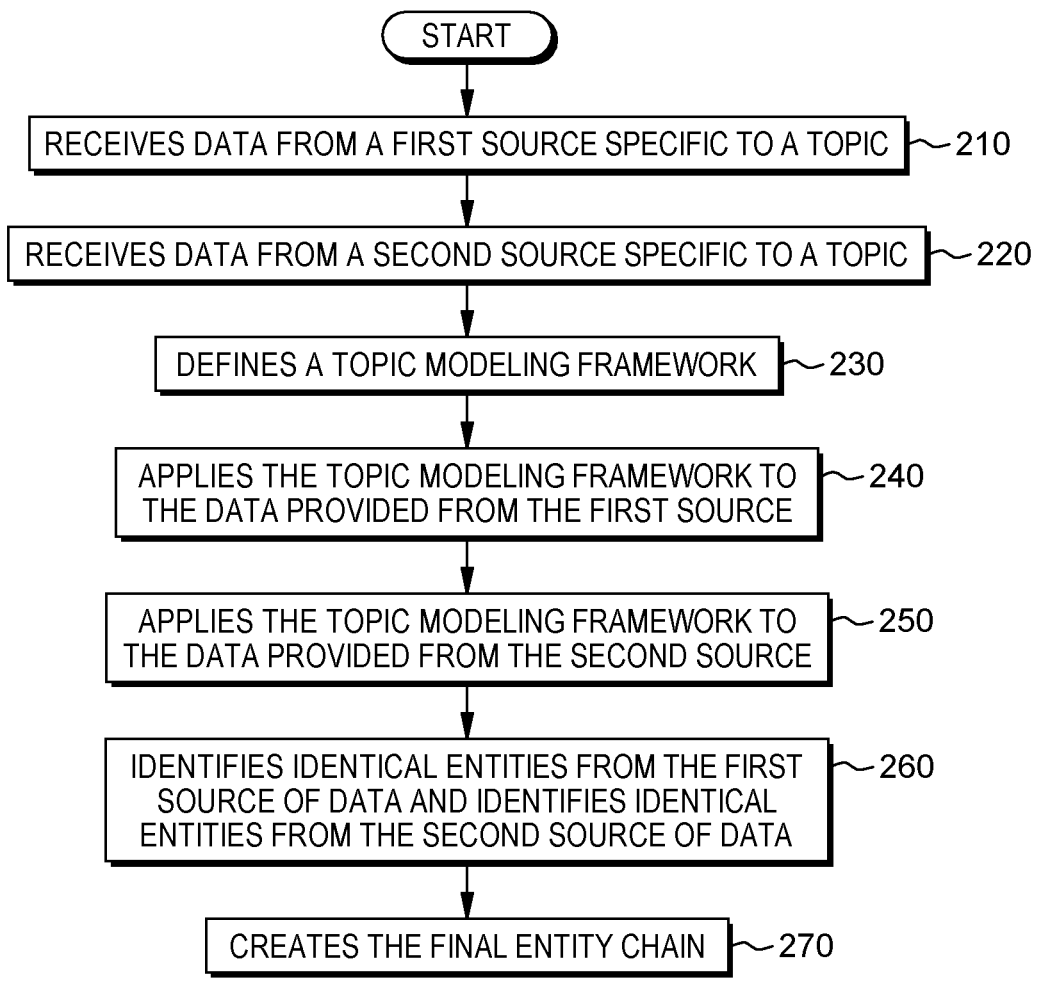
FIG. 2 is a flowchart depicting operational steps of a semi-supervised clinical entity generator for constructing identical entity chains, in accordance with the present invention.

FIG. 2 is a flowchart depicting the operational steps of program 200, a program for semi-supervised entity generation, integrated with similarity retrievable modules, from structured, and unstructured, data, in accordance with an embodiment of the present invention.

In step 210, program 200 receives data from a first source specific to a topic. In one embodiment, a first source provides unstructured, or structured data to program 200 (e.g., in the form of clinical notes). In an embodiment, program 200 analyzes raw text, in conjunction with accessing the UMLS knowledge base, to contextualize medical jargon, in order to annotate text input. In an example, program 200 can process raw clinical notes and knowledge resources in a streamlined fashion. Program 200, utilizing an input annotator, analyzes a set of clinical notes to discover a preliminary set of entities. Program 200 deduces, from the presented text, that the notes include medical jargon. In one scenario, program 200 can receive data in the form of text from a web-based portal that is used for patient records. In another scenario, the data in the form of text can be uploaded from an electronic health records website. In yet another scenario, data in the form of the text can be downloaded from a manual scan of a patient's unstructured medical notes in a chart.

In step 220, program 200 receives data from a second source specific to a topic. A second source of data provides unstructured or structured data (e.g., in the form of clinical notes). In an embodiment, the second source can provide data that is from the same source that the first source provides data, or a different type relative to the first source. For example, if the first source provides structured data, then the second source can provide structured data as well. Alternatively, the first source can provide unstructured data, and the second source can provide unstructured data as well. Further, the second source can provide unstructured data while the first source provides structured data, or vice versa.

In an example, the second source is unstructured handwritten notes of a physician, while the first source is structured notes from a web-based portal. Program 200, utilizing the input annotator, analyzes the unstructured text to highlight medical jargon. Program 200 annotates clinically relevant mentions provided from the structured source of text while simultaneously, if applicable, annotating clinically relevant mentions from the unstructured text. Mentions are the intermediate between unanalyzed text data and the eventually derived entity chains.

Program 200 annotates, or highlights clinically relevant text to provide information, or contextualize the text in the larger textual entity, without fundamentally altering the text as the text exists within relation to the other text. In an example embodiment, program 200 is capable of analyzing structured and unstructured data from various sources, to deduce a clinically significant event in a patient's medical history. Program 200 is also capable of constructing a traceable longitudinal electronic health record from analyzing unstructured and structured clinical data relative to, as elicited from the patient health record, the dates of the medically significant events as related to a timeline of the patient's health record.

In step 230, program 200 defines a topic modeling framework. In one embodiment, program 200 utilizes feature extractor 180 to initiate a statistical process of discovering abstract "topics" that occur in a collection of clinical documents. Program 200 mines the clinically relevant text, using mention recognizer 182, to discover hidden semantic structures in the body of the text. Topic modeling is a text-mining tool for the discovery of hidden semantic structures in a text body. Topic modeling develops the topic modeling framework through using a statistical process of discovering the abstract topics that occur in a collection of documents. Program 200 uses the topic modeling framework to preliminarily establish the boundaries that program 200 will use in creating the novel entity chains from the unanalyzed collection of text.

In another embodiment, program 200 utilizes a natural language processing driven sub program, not shown, to extract medically relevant jargon from the unstructured, or structured, textual source. In an example, program 200, utilizing a raw text reader sub program, in conjunction with a markable reader sub program, detects sentences from the structured or unstructured medically relevant text. Program 200 uses an information retrieval based knowledge resource feature extractor to activate the concept unique identifier, as indicated in step 210 in conjunction with UMLS, to delineate between medically relevant concepts that are embedded within the structured or unstructured text. For example, program 200 mines the text and determines that the phrase, "total abdominal hysterectomy," contains medically relevant jargon that program 200 recognizes as a unique concept. Program 200 reduces the unique concept from "total abdominal hysterectomy," to "abdominal hysterectomy," and eventually to "hysterectomy" in order to extract the clinically (or medically relevant) jargon from the text.

Program 200 simultaneously applies the natural language processing driven feature extractors to the structured, or unstructured text, to find non unique concepts or, medically irrelevant, text. Program 200 utilizes a clear parser to delineate phrases, such as, "a CT scan on the chest," and break the phrases into their constituent medically irrelevant words, such as, "a," "CT scan," "on," "the," and "chest." Program 200 uses the extracted clinically relevant, and clinically irrelevant, jargon to create structural constraints or borders that will eventually be used in constructing the novel entity chains.

In step 240, program 200 applies the topic modeling framework to the data provided from the first source. In an embodiment, program 200 applies the topic modeling framework, from step 230, to the data received (in step 210) from the first source (e.g., structured or unstructured data, in the form of medical notes). In an example, program 200, using the language constraints derived in step 230, applies a sentence detector sub program, not shown, to analyze the first structured, or unstructured medical notes. Next, program 200, utilizes a tokenizer sub program to segment the derived text into words and sentences.

Tokenization is the application of the topic modeling framework; an identification of basic program 200 to process and further apply the topic modeling framework. Given the character sequence and a defined document unit, structured, or unstructured, medical notes, tokenization is the task of chopping the defined document up into pieces, called tokens, and eliminating certain characters, such as punctuation. These tokens are often loosely referred to as terms or words, but it is sometimes important to make a type/token distinction. A token is an instance of a sequence of characters in some particular document that are grouped together as a useful semantic unit for processing. A type is the class of all tokens containing the same character sequence. A term is a (perhaps normalized) type that is included in the UMLS dictionary.

In all modern languages that use a Latin-, Cyrillic-, or Greek-based writing system, such as English and other European languages, word tokens are delimited by a blank space. Program 200 replaces white spaces with word boundaries and cuts off leading and trailing quotation marks, parentheses, and punctuation. The majority of existing tokenizers signal token boundaries by white spaces. Program 200, utilizing the tokenizer that applies the topic modeling framework, finds two tokens directly adjacent to each other, as, for instance, when a word is followed by a comma, and program 200, utilizing the tokenizer, inserts a white space between them.

Program 200 utilizes database 170 to maintain a list of abbreviations. Program 200, during the tokenization of a set of text, can access database 170 for the list and, if it is found there, it is tokenized as a single token, otherwise the period is tokenized as a separate token.

Program 200 utilizes a part of speech tagger sub program to further analyze the structured, or unstructured notes. Program 200 utilizes part-of speech tagger (POS tagger) sub program, not shown, to initiate the process of marking up a word in a text (corpus) as corresponding to a particular part of speech, based on both the definition of the word and the context of the word, i.e., the relationship of the word with adjacent and related words in a phrase, sentence, or paragraph, as determined by program 200. Program 200 uses algorithms which associate discrete terms, as well as hidden parts of speech, in accordance with a set of descriptive tags. In an example embodiment, program 200 utilizes a stochastic part-of speech tagger (POS tagger) algorithm.

Program 200 utilizes a dependency parser sub program to further apply the derived topic modeling framework. Dependency parsing is the task of recognizing a sentence and assigning a syntactic structure to it. A natural language parser is a program that works out the grammatical structure of sentences, for instance, which groups of words go together (as "phrases") and which words are the subject or object of a verb. Program 200 uses knowledge of language gained from data, or the history of a previous analysis performed by program 200 and saved to database 170 to try to produce the most likely analysis of new sentences. Program 200, through the dependency parser sub program, employs a parse tree to deconstruct the text. The parse tree is useful in grammar checking and plays an essential role in the semantic analysis stage. For example, to answer the question, "Who is the point guard for the LA Lakers in the next game?," program 200 employs the dependency parser sub program, determines the subject, objects, and attributes to understand that the user wants the point guard of the LA Lakers specifically for the next game.

Program 200 delineates between multiple parse trees, which are referred to as ambiguities. For example, a sentence, "Book that flight." can form multiple parse trees based on its ambiguous part of speech tags unless these ambiguities are resolved. Program 200 chooses a correct parse from the multiple possible parses through syntactic disambiguation.

Program 200 utilizes a lookup window annotator subprogram in conjunction with the markable reader subprogram previously activated to tag words comprising a mention to assign them to the text feature defined as a constraint in step 230. In this example, program 200 performs a cross check of the tagged word with the UMLS dictionary in order to substantiate that the tagged word is in fact an identified unique concept.

In step 250, program 200 applies the topic modeling framework to data provided from the second source. In various embodiments, program 200 applies the topic modeling framework utilizing processes and programs described above with regard to step 240 (e.g., applying the topic modeling framework, utilizing the tokenization process to further implement the topic modeling framework, to develop the foundation for the creation of the identical entity chains, etc.).

In step 260, program 200 identifies identical entities from the first source of data and identifies identical entities from the second source of data. In an embodiment, program 200 enhances entity generation through integrating similarity metrics and further applying, as done in step 240 and step 250, the topic modeling process to the data provided by the source. Program 200 clusters identical mentions, as derived and extracted individually from the source of data in the previous steps, into one chain and creates an output of a final entity chain repository. The final chain is a result of the process of clustering identical mentions. Program 200 can determine identical mentions by highlighting mentions that refer to the same entity and analyzing mentions from entity chains.

In an example, program 200 integrates similarity metrics and the developed topic modeling framework, as discussed in step 230, to enhance the identical entity generation by entity generator 186. Program 200 estimates the entity similarity by analyzing the number of mentions of a clinically relevant topic from the clinical data provided by the first source of clinical notes and from the clinical data provided by the second source of clinical notes. Program 200 clusters the identical mentions by finding mentions referring to the same entities and identical mentions. Program 200 applies the mentions that refer to the same clinical note entities created as a result of the topic modeling framework from step 230 to the entities.

In step 270, program 200 creates the final entity chain. In an embodiment, program 200, through the entity generator 186, uses Gibbs sampling for the final entity chain generative process. In an example, program 200 generates the entities that will eventually be chained together in the final identical entity chain; from N, total number of documents; K, total number of entities in one document; and M, number of mentions in one document, used for the entity similarity estimation.

Program 200 uses the Gibbs sampling generative process to chain together the inferences. Program 200, through the Gibbs sampling generative process, links the inferencing and chaining process. Program 200 utilizes a Markov chain algorithm for obtaining a sequence of observations which are approximated from a specified multivariate probability distribution. The algorithm is a statistical process of discovering the abstract mentions that occur in the collection of structured or unstructured text provided from the medical notes. Program 200 uses stochastic inferencing to create and direct the entity chaining for the final output of constructing a co-reference chain from a set of clinical notes.

In another example, program 200 utilizes stochastic inferencing to create the foundation that is used to link the chain of mentions to the entities. In this example, program 200 utilizes a mention type assignment where Tt={person, problem, test, treatment}. Program 200 employs the formula: $z*k/d \sim Multi(t*k/d)$ to connect the finalized mention-entity assignment created in step 260 where a soft max is computed for each mention. Program 200 creates the expected output of clusters of mentions and entities that are linked as a result of the stochastic inferencing.

Figure 3:
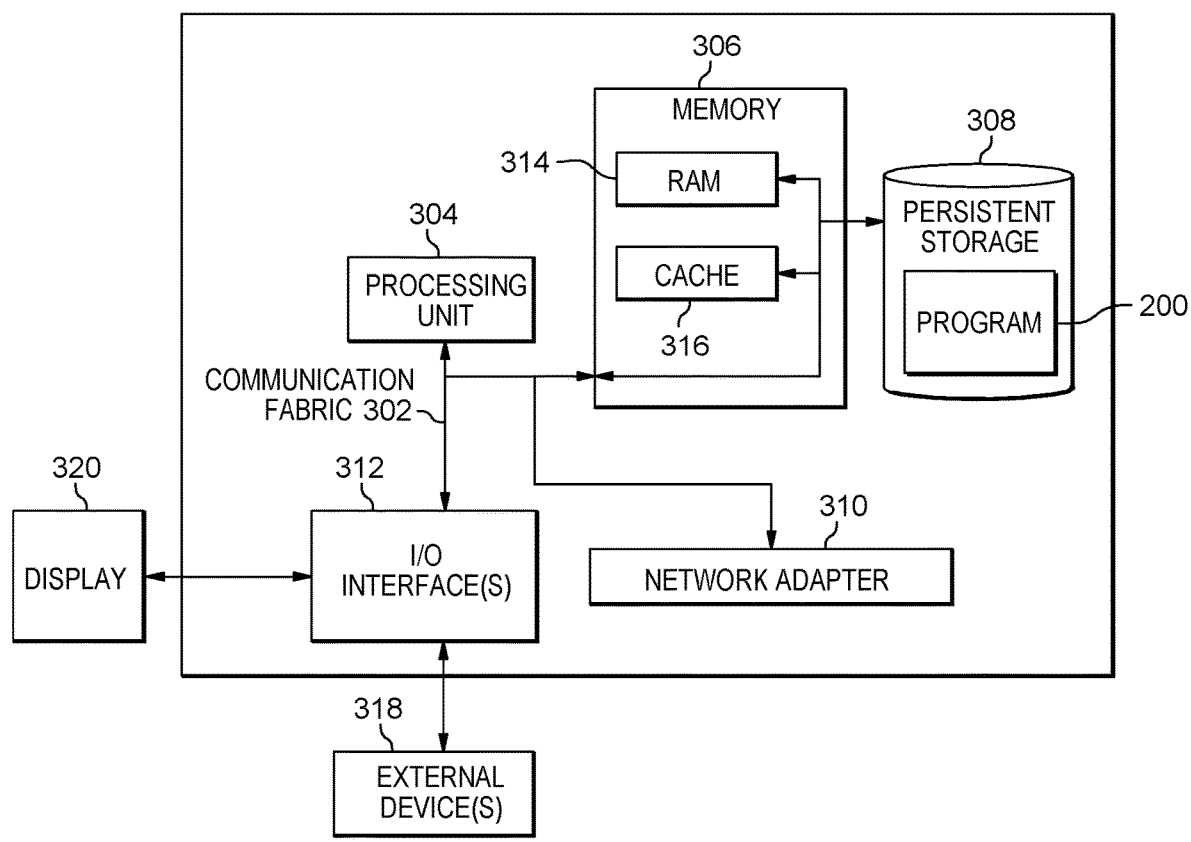
FIG. 3 is a block diagram of components of the proxy server computer executing the intelligent mapping program, in accordance with an embodiment of the present invention.

FIG. 3 depicts a block diagram of components of server computer 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 includes communications fabric 302, which provides communications between cache 316, memory 306, persistent storage 308, network adapter 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory 314 (RAM). In general, memory 306 can include any suitable volatile or non-volatile computer readable storage media. Cache 316 is a fast memory that enhances the performance of computer processor unit(s) 304 by holding recently accessed data, and data near accessed data, from memory 306.

Program 200 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Network adapter 310, in these examples, provides for communications with other data processing systems or devices. In these examples, network adapter 310 includes one or more network interface cards. network adapter 310 may provide communications through the use of either or both physical and wireless communications links. Program 200 may be downloaded to persistent storage 308 through network adapter 310.

I/O interface(s) 312 allows for input and output of data with other devices that may be connected to server computer 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for analyzing data from a plurality of data sources, the method comprising:
    extracting, by one or more processors, features of data received from a first data source and features of the data received from a second data source by analyzing the data received from the first data source and the data received from the second data source;
    determining, by one or more processors, a topic modeling framework, wherein the topic modeling framework detects a semantic structure of the features of the data received from the first data source and the data received from the second data source;
    applying, by one or more processors, the topic modeling framework to the data received from the first data source and to the data received from the second data source;
    constructing, by one or more processors, a plurality of identical entity chains from the first data source and the second data source, wherein constructing the plurality of identical entity chains includes analyzing a number of mentions of a relevant topic from data provided by the first data source and from the data provided by the second data source, and wherein analyzing the number of mentions of the relevant topic includes clustering identical entity mentions by finding the number of mentions referring to the plurality of identical entity chains; and
    generating, by one or more processors, a final entity output, wherein the final entity output includes a cluster of identical entity mentions from the plurality of identical entity chains.

2. The method of claim 1:
    wherein the data received from the first data source includes unstructured data, and
    wherein the data received from the data source includes structured data that is formatted and contained in a relational database.

3. The method of claim 1, wherein determining the topic modeling framework further comprises:
    querying, by one of more processors, a knowledge resource to identify concepts that are associated with the features extracted from the data received from the first data source and the features extracted from the data received from the second data source; and
    determining, by one or more processors, the topic modeling framework based on the features extracted from the data received from the first data source and the features extracted from the data received from the second data source.

4. The method of claim 1 wherein generating a final entity output, further comprises:
    integrating, by one or more processors, a data ranking model, wherein the data ranking is based on a measure of the similarity of the data to the identified topic model, to identify data that refers to the same entity;
    generating, by one or more processors, an identical entity from the data received from the first data source and of the data received from the second data source, wherein an identical entity is constructed from a mention that refers to similar entities; and
    generating, by one more processors, a chain of individual entities from the data received from the first data source and of the data received from the second data source by extracting the generated identical entities.

5. The method of claim 1 wherein extracting features of data received from data first source and features of the data received from the second data source, further comprises:
    determining, by one or more processors, that text included in the data received from the first data source does not include concepts that relate to a knowledge resource based on an analysis of the text.

6. The method of claim 1 wherein applying the topic modeling framework further comprises:
    activating, by one or more processors, a tokenization process, wherein a tokenization process subdivides a plurality of text during application of the topic modeling framework.

7. The method of claim 1, further comprising:
    analyzing, by one or more processors, unstructured data and structured data utilizing semi-supervised learning and unsupervised learning.

8. A computer program product for analyzing data from a plurality of data sources, the computer program product comprising:
    one or more computer readable tangible storage media and program instructions stored on at least one of the one or more computer readable storage media, the program instructions readable/executable by one or more computer processors and further comprising:
    program instructions to extract features of data received from a first data source and features of the data received from a second data source by analyzing the data received from the first data source and the data received from the second data source;
    program instructions to determine a topic modeling framework, wherein the topic modeling framework detects a semantic structure of the features of the data received from the first data source and the data received from the second data source;

program instructions to apply the topic modeling framework to the data received from the first data source and to the data received from the second data source;
program instructions to construct a plurality of identical entity chains from the first data source and the second data source, wherein constructing the plurality of identical entity chains includes analyzing a number of mentions of a relevant topic from data provided by the first data source and from the data provided by the second data source, and wherein analyzing the number of mentions of the relevant topic includes clustering identical entity mentions by finding the number of mentions referring to the plurality of identical entity chains; and
program instructions to generate a final entity output, wherein the final entity output includes a cluster of identical entity mentions from the plurality of identical entity chains.

9. The computer program product of claim 8:
wherein the data received from the first data source includes unstructured data, and
wherein the data received from the second data source includes structured data that is formatted and contained in a relational database.

10. The computer program product of claim 8, wherein the program instructions to determine the topic modeling framework further comprise program instructions, stored on the one or more computer readable storage media, which when executed by a processor, cause the processor to:
query a knowledge resource to identify concepts that are associated with the features extracted from the data received from the first data source and the features extracted from the data received from the second data source; and
determine the topic modeling framework based on the features extracted from the data received from the first data source and the features extracted from the data received from the second data source.

11. The computer program product of claim 8, wherein the program instructions to generate a final entity output, further comprise program instructions, stored on the one or more computer readable storage media, which when executed by a processor, cause the processor to:
integrate a data ranking model, wherein the data ranking is based on a measure of the similarity of the data to the identified topic model, to identify data that refers to the same entity;
generate an identical entity from the data received from the first data source and of the data received from the second data source, wherein an identical entity is constructed from a mention that refers to similar entities; and
generate a chain of individual entities from the data received from the first data source and of the data received from the second data source by extracting the generated identical entities.

12. The computer program product of claim 8 wherein the program instructions to extract features of data received from the first data source and features of the data received from the second data source, further comprise program instructions, stored on the one or more computer readable storage media, which when executed by a processor, cause the processor to:
determine that text included in the data received from the first data source does not include concepts that relate to a knowledge resource based on an analysis of the text.

13. The computer program product of claim 8 wherein the program instructions to apply the topic modeling framework further comprise program instructions, stored on the one or more computer readable storage media, which when executed by a processor, cause the processor to:
activate a tokenization process, wherein a tokenization process subdivides a plurality of text during application of the topic modeling framework.

14. The computer program product of claim 8 further comprising program instructions, stored on the one or more computer readable storage media, which when executed by a processor, cause the processor to:
analyze unstructured data and structured data utilizing semi-supervised learning and unsupervised learning.

15. A computer system comprising:
one or more computer processors;
one or more computer readable storage media; and
program instructions stored on the computer readable storage media for execution by at least one of the one or more computer processors, the program instructions comprising:
program instructions to extract features of data received from a first data source and features of the data received from a second data source by analyzing the data received from the first data source and the data received from the second data source;
program instructions to determine a topic modeling framework, wherein the topic modeling framework detects a semantic structure of the features of the data received from the first data source and the data received from the second data source;
program instructions to apply the topic modeling framework to the data received from the first data source and to the data received from the second data source;
program instructions to construct a plurality of identical entity chains from the first data source and the second data source, wherein constructing the plurality of identical entity chains includes analyzing a number of mentions of a relevant topic from data provided by the first data source and from the data provided by the second data source, and wherein analyzing the number of mentions of the relevant topic includes clustering identical entity mentions by finding the number of mentions referring to the plurality of identical entity chains; and
program instructions to generate a final entity output, wherein the final entity output includes a cluster of identical entity mentions from the plurality of identical entity chains.

16. The computer system of claim 15:
wherein the data received from the first data source includes unstructured data, and
wherein the data received from the second data source includes structured data that is formatted and contained in a relational database.

17. The computer system of claim 15, wherein the program instructions to determine the topic modeling framework further comprise program instructions, stored on the one or more computer readable storage media, which when executed by a processor, cause the processor to:
query a knowledge resource to identify concepts that are associated with the features extracted from the data received from the first data source and the features extracted from the data received from the data second source; and
determine the topic modeling framework based on the features extracted from the data received from the first data source and the features extracted from the data received from the second data source.

18. The computer system of claim 15, wherein the program instructions to generate a final entity output, further comprise program instructions, stored on the one or more computer readable storage media, which when executed by a processor, cause the processor to:
- integrate a data ranking model, wherein the data ranking is based on a measure of the similarity of the data to the identified topic model, to identify data that refers to the same entity;
- generate an identical entity from the data received from the first data source and of the data received from the second data source, wherein an identical entity is constructed from a mention that refers to similar entities; and
- generate a chain of individual entities from the data received from the first data source and of the data received from the second data source by extracting the generated identical entities.

19. The computer system of claim 15 wherein the program instructions to extract features of data received from a first source and features of the data received from a second source, further comprise program instructions, stored on the one or more computer readable storage media, which when executed by a processor, cause the processor to:
- determine that text included in the data received from the first data source does not include concepts that relate to a knowledge resource based on an analysis of the text.

20. The computer system of claim 15 wherein the program instructions to apply the topic modeling framework further comprise program instructions, stored on the one or more computer readable storage media, which when executed by a processor, cause the processor to:
- activate a tokenization process, wherein a tokenization process subdivides a plurality of text during application of the topic modeling framework.

\* \* \* \* \*